March 10, 1931.   W. WAIT, JR   1,795,910
ADJUSTABLE CONTROL FOR AIRCRAFT
Filed Oct. 15, 1928   2 Sheets-Sheet 1
Fig.1
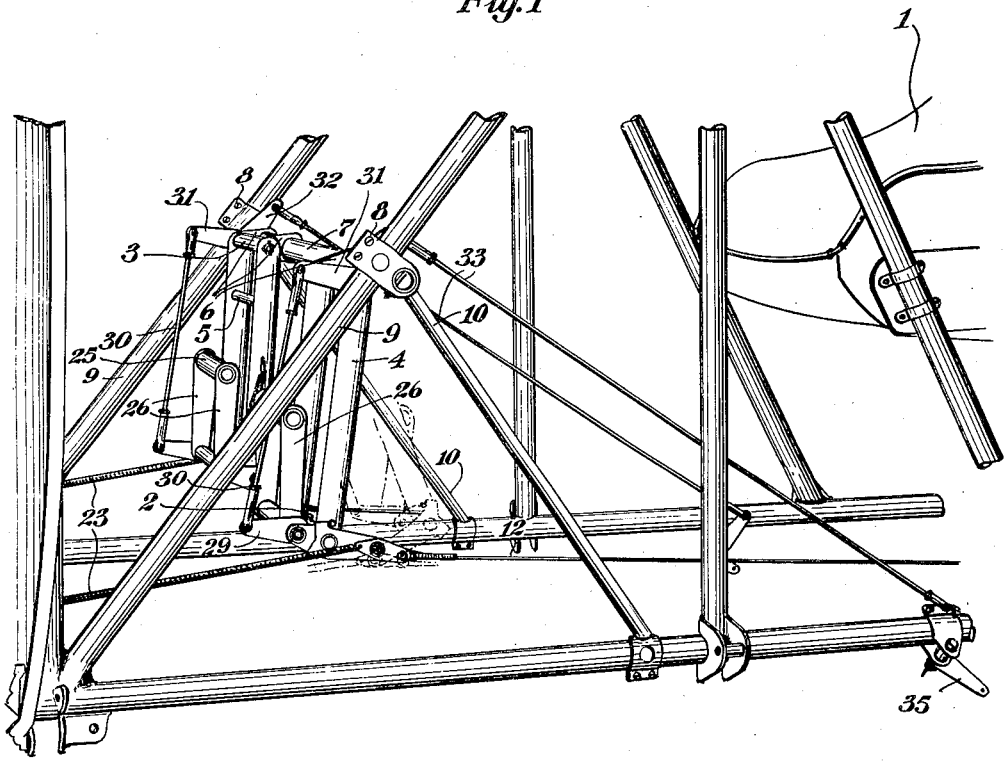
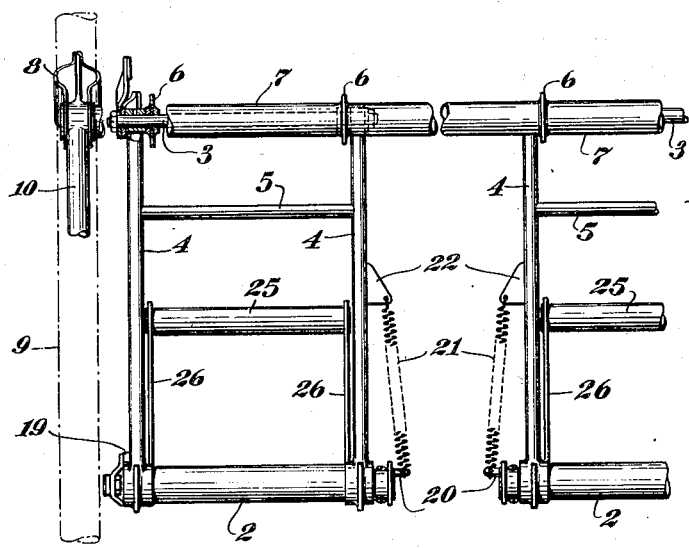
Fig.4
INVENTOR
William Wait, Jr.,
BY Eyre Scott & Keel
ATTORNEYS

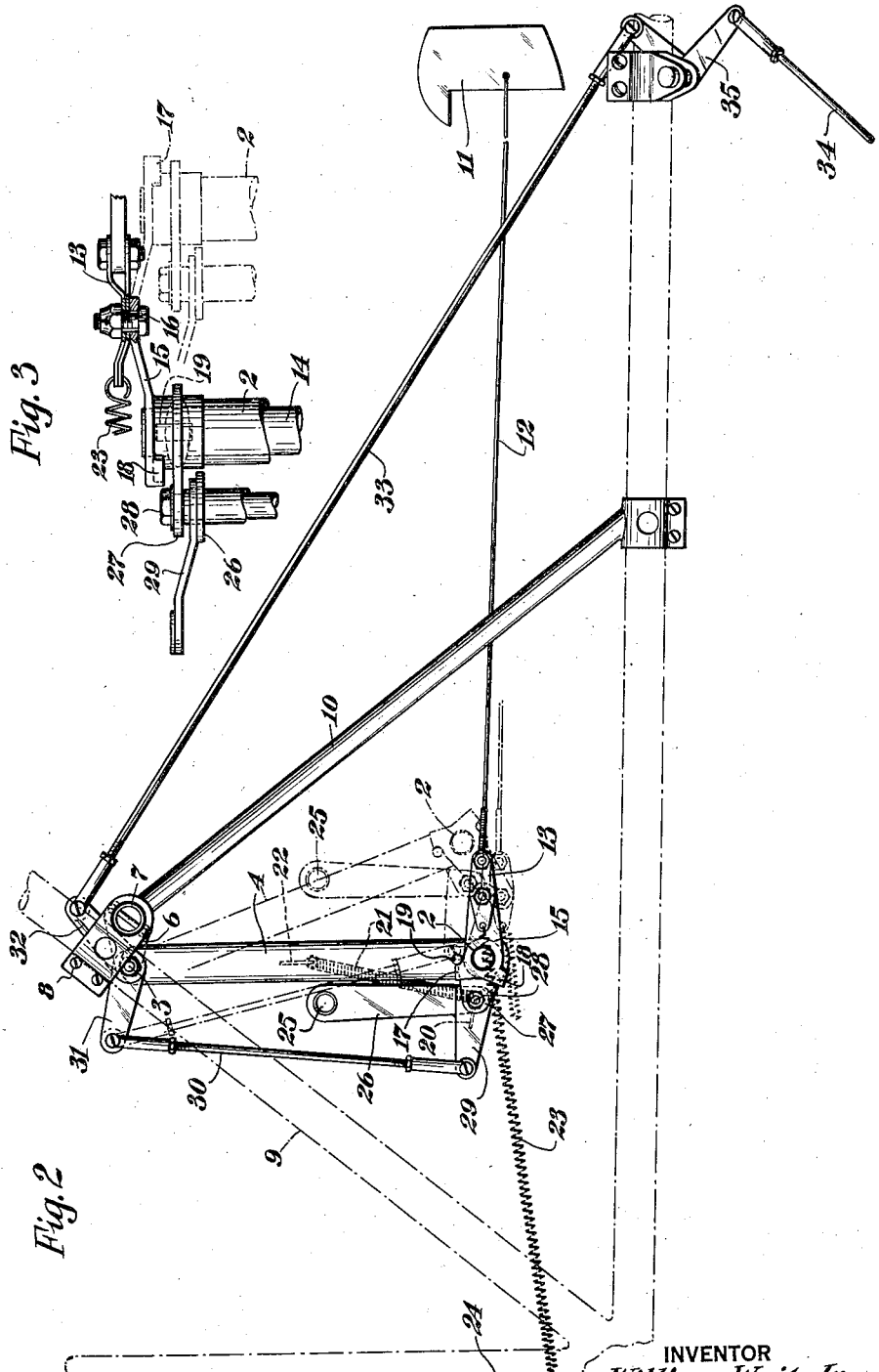

Patented Mar. 10, 1931

1,795,910

UNITED STATES PATENT OFFICE

WILLIAM WAIT, JR., OF GARDEN CITY, NEW YORK, ASSIGNOR TO CHANCE M. VOUGHT, OF GRENWOLDE, GREAT NECK, NEW YORK

ADJUSTABLE CONTROL FOR AIRCRAFT

Application filed October 15, 1928. Serial No. 312,467.

This invention relates to an adjustable mechanism for aircraft controls and the like.

The object of the invention is an adjustable control adaptable to pilots or operators of differing heights and reach, and particularly a mechanism which may be readily and quickly adjusted without necessitating a change in the link or cable connections leading to the control. A further object is a mechanism of this general character which possesses marked simplicity in construction and operation, may be manipulated and adjusted by the unskilled with marked facility, and is particularly adapted to use in aircraft controls, though possessing certain features of more general application.

I have shown my invention as embodied in a pedal control for aircraft, and for a better understanding of the above indicated novel features, and others which will hereinafter appear, reference may be had to the accompanying drawings, wherein—

Fig. 1 is a perspective view of a skeleton fuselage framework illustrating the control cockpit;

Fig. 2 is a side view of the adjustable pedal mechanism;

Fig. 3 is a plan view of certain parts thereof; and

Fig. 4 is a front view of the pedal mechanism.

I have illustrated my invention as embodied in a pedal control for aircraft including a cockpit or control compartment having a seat 1 therein, the compartment for example, being the cockpit of a fuselage of an airplane. There is a pair of control pedals 2 disposed forwardly of the seat 1 in a position to be actuated by a pilot or operator from seat 1. Each of the pedals 2 is suspended by a rectangular frame for swinging movements back and forth about the axis 3, these frames consisting of two elongated side frame members 4, a cross member 5 and the pedal member 2, these parts being of tubular construction, and the pedal 2 functioning as a journal for the control attachment mechanism hereinafter more fully described. The pedal frames are journaled upon a shaft on the axis 3, and the shaft is carried by a pair of brackets 6 projecting forwardly from the cross member 7 supported by bracket 8 which in turn is carried by a diagonal 9 of the fuselage frame, and braced by the member 10.

The pedals 2 are connected with the element to be controlled, as, for example, a rudder 11 of an airplane through the cables or link connections 12, in the specific instance shown cables being illustrated, there being a connection 12 for each side of the rudder in the usual manner. The cables 12 are connected off center by means of the connecting members 13 with the pedals 2, these connections being such as to permit the pedals 2 to be shifted to either side of the connecting members 13, which in the neutral position of the rudder or other element to be controlled, occupy a fixed or substantially fixed position in the fore and aft direction. These off center connections include oscillatory shafts 14 extending through the hollow pedal members 2, each of these shafts carrying on one end a crank or lever arm 15 to the outer end of which is pivotally connected the connecting member 13, this pivotal connection being indicated at 16. Each of the crank arms 15 is provided with the shoulders 17 and 18 on opposite sides of the axis of the pedal, which shoulders or lugs engage a pin 19 serving as a stop for limiting the oscillatory movement of the shaft 14. These shoulders or lugs 18 are indicated as formed by inwardly turned ears formed on the inner end of the crank arm 15. The opposite end of each of the shafts 14 carries a lever or crank arm 20, and this crank arm 20 is connected by means of a spring 21 with a relatively fixed part 22 of the pedal frame member 4, this spring 21 biasing the shaft 14 in a direction to cause the shoulder 17 or 18 to bear tightly against the stop 19 in either of the adjusted positions. The connections 12 may be either cables or links, as indicated above, and if cables they may be either continuous or discontinuous. When discontinuous cable connections are used, it is desirable to employ springs 23, one for each of the two connectors 13, each spring 23 being connected with its corresponding connector 13 at one end and at the other end being connected with a fixed part 24 of the fuselage frame, the adjustment being such that the springs 23 adjust the rudder 11 or other element to be controlled to a neutral or predetermined position. In the position shown in the drawing in full lines the adjustment is for a pilot or operator having a long reach. For an operator of shorter reach the pedals 2 may be very readily and quickly adjusted rearwardly to compensate for the shorter reach. For example, it is only necessary to engage the crank arm or lever 20 and rotate it around against the tension of spring 21, giving it approximately 180° shift. This operation results in the crank arm or lever 15 being likewise shifted approximately 180° with the consequent counter-clock movement of the pedal 2 about the axis 3, the suspending frame of the pedal taking the inclined position indicated in dotted lines in Figs. 1 and 2. The shoulder 18 instead of shoulder 17 is now in engagement with the stop 19. During this shift of shaft 14 from one position to the other the connecting member 13 is merely lifted in a vertical direction against the tension of its spring 23, the connections 12 and springs 23 normally holding the connectors 13 fixed in a fore and aft direction, and after the shift from one position to the other the connector 13 occupies approximately the same vertical elevation, although there is a slight shift in the elevation thereof due to the connections illustrated. The pedal 2 may similarly be shifted back to the extreme forward position by shifting the crank arms 20 around 180°. Thus by merely shifting the lever 20 from one side to the other the pedal 2 is moved forwardly or rearwardly without affecting the connections with the rudder or other element to be controlled. Each pedal 2, of course, has a separate adjusting mechanism, and the construction and operation are identical.

Each of the pedals 2 carries an auxiliary brake control pedal 25, this pedal being carried by a pair of upstanding frame members 26, the latter being in turn carried by a pair of bracket members 27 projecting forwardly of the pedal frame member 2, as, for example, by means of a shaft 28 journaled in said brackets. A lever arm 29 is fixed to the shaft 28, and is pivotally connected by means of a link 30 with an upper lever arm 31 which is pivoted upon the axis 3, the members 4, 29, 30 and 31 being substantially in the form of a parallelogram to avoid brake operation during movements of the pedal frame 4. The lever arm 30 is directly connected with a lever arm 32, and the latter is connected through the links 33, 34 and the bell crank 35 with the brake adjusting mechanism on the side corresponding to this particular pedal. The brake operating pedal 25 is indicated as being disposed above the level of the pedals 2, and accordingly the pilot may engage a pedal 25 by the toe for operating the brake or brakes without affecting the rudder operation.

I claim:

1. A control mechanism for aircraft including an element to be controlled, operating connections leading to said control element, a manually operated device, pivoted means fastening the device to the connections and permitting the shifting of the device about the pivotal point relatively to the connections without altering the latter and means for retaining the device in either of its adjusted positions.

2. An aircraft control of the character set forth in claim 1, wherein the fastening means between the manually operated device and the connections includes a crank arm pivotally connected thereto.

3. A control mechanism for aircraft including an element to be controlled, operating connections leading to said control element, a manually operated device, and means for connecting the device and the connections permitting the shifting of the device relatively to the connections without altering the latter, the connecting means between the manually operated device and the connections including a crank arm pivotally connected thereto, together with a stop for arresting the crank arm in its operative position.

4. A control mechanism for aircraft including an element to be controlled, operating connections leading to said control element, a manually operated device, and means for connecting the device and the connections permitting the shifting of the device relatively to the connections without altering the latter, the connecting means between the manually operated device and the connections including a crank arm pivotally connected thereto, together with a spring biased and stop mechanism which permits the manually operated device to be shifted over from one side of the pivotal connection to the other.

5. In a control for aircraft the combination of an element to be controlled, operating connections leading to said element for actuating the same in opposite directions, a manually controlled device adjustably and pivotally fastened to said connections in such manner as to permit the ready rotation of the device about the pivotal point to different positions relatively to the control seat, and means for retaining the device in either of its adjusted positions.

6. A control mechanism for aircraft including a manually operated device and a crank arm connection with the element to be controlled, said crank arm being pivotally connected with both the element to be controlled and the manually operated device, together with means for arresting the manually operated device on either side of the pivotal connection with the element to be controlled.

7. In a control for aircraft the combination of an element to be controlled, operating connections for actuating said element in opposite directions, a manually operated device, and a lever arm pivotally connected with both said device and said connections, and arranged to permit the shifting over of the manually operated device from one side to the other of the pivotal connection with the operating connections.

8. A control of the character as set forth in claim 7, including a spring biased and stop mechanism for arresting said lever in its adjusted positions.

9. In a control of the character set forth in claim 7, wherein the operating connections are in the form of cables.

10. In a control of the character set forth in claim 7, wherein the operating connections are in the form of a cable connected at one end to the control element and spring biased at the other end.

11. An adjustable pedal control mechanism for aircraft including a swinging pedal and a crank arm connection between the pedal and the control, permitting the ready shifting of the pedal to different positions relatively to the pilot's seat, without altering the control connections, the control including a cable and the crank or lever arm which is normally disposed in the direction of the cable pull and is pivotally connected with the cable in a manner to permit the shifting of the pedal in the fore and aft direction to opposite sides of the pivotal connection.

12. An adjustable pedal control mechanism for aircraft including a swinging pedal and a crank arm connection between the pedal and the control, permitting the ready shifting of the pedal to different positions relatively to the pilot's seat, without altering the control connections, the control including a cable and the crank or lever arm which is normally disposed in the direction of the cable pull and is pivotally connected with the cable in a manner to permit the shifting of the pedal in the fore and aft direction to opposite sides of the pivotal connection, and including a spring biased and stop mechanism for arresting the pedal on either side of the pivotal point.

13. An adjustable pedal control mechanism for aircraft including a pivoted frame carrying on its free end a pedal and a crank arm pivotally connected at one end to the frame and at the other end to the control to be actuated whereby the pedal and pivoted frame may be shifted to different positions relatively to the pilot's seat, by turning the crank arm so as to bring the pivotal point of the arm and frame towards or away from the seat.

14. An adjustable control including an element to be actuated, a manually operated device, and a link connecting the device with the element, the connection with the latter being a pivotal one and permitting the rotation of the device and link about the pivotal point to two different positions and means for retaining the device and link in either of the two positions to which it has been adjusted.

In testimony whereof, I have signed my name to this specification.

WILLIAM WAIT, Jr.